United States Patent [19]

Barnard

[11] Patent Number: 4,664,185
[45] Date of Patent: May 12, 1987

[54] FREEZE PROOF CONTROL CENTER FOR SUBMERSIBLE PUMPS

[76] Inventor: Marshall B. Barnard, 314 9th St., Fowler, Colo. 81039

[21] Appl. No.: 765,857

[22] Filed: Aug. 14, 1985

[51] Int. Cl.⁴ .......................... E21B 43/12; E03B 3/12
[52] U.S. Cl. ..................................... 166/66; 166/68; 137/301; 417/38
[58] Field of Search ................ 166/66, 68, 105, 105.5, 166/369; 137/281, 282, 301; 417/38, 44

[56] References Cited

U.S. PATENT DOCUMENTS

| | | | |
|---|---|---|---|
| 2,829,597 | 4/1958 | Patterson | 166/68 |
| 3,457,864 | 7/1969 | Price | 417/44 |
| 3,480,027 | 11/1969 | Noland | 137/306 |
| 3,563,671 | 2/1971 | Weber | 417/38 |
| 3,770,003 | 11/1973 | Uroshevich | 137/281 |
| 4,304,526 | 12/1981 | Shetler, Sr. | 417/38 |

*Primary Examiner*—James A. Leppink
*Assistant Examiner*—Terry Lee Melius
*Attorney, Agent, or Firm*—Timothy J. Martin

[57] ABSTRACT

A control system for a pump submersible in a well having a water pipe extending upwardly to a water source includes an isolation element that has one fluid chamber in communication with the water pipe and another chamber separated from the first by a flexible diaphragm. The second fluid chamber is filled with a non-toxic antifreeze control fluid and communicates with a fluid conduit which extends upwardly to a pressure switch. The pressure switch is mounted above-ground and monitors the pressure of the control fluid to activate and deactivate the pump. Since the diaphragm is flexible, the pressure of the control fluid corresponds to the water pressure in the water pipe. The isolation element is positioned in the well below the frost line so that all control parts in contact with water are located below the frost line, and all control parts located above the frost line contact only the antifreeze solution. The pressure switch and related electronics may be enclosed in and protected by a bell housing on the upper portion of the well casing to eliminate the standard pump house or well pit.

18 Claims, 6 Drawing Figures

FREEZE PROOF CONTROL CENTER FOR SUBMERSIBLE PUMPS

BACKGROUND OF THE INVENTION

The present invention relates to a control system operative to monitor fluid pressure in order to control an electric apparatus in response to the pressure of the fluid. Specifically, the present invention is adapted as a pump control apparatus used to control the operation of a pump, such as a submersible pump in a water well. The pump control apparatus of this invention is therefore directed to providing a freeze-proof control unit for a submersible pump that eliminates many problems confronting existing pump control systems.

The typical construction of a conventional modern pump system involves the placing of a submersible pump at the bottom of a well casing located at the source of the water to be pumped to the earth's surface. The water pipe from the submersible pump extends upwardly to terminate at a releasable elbow, called a pitless adaptor, which is located below the frost line for the geographical region of the well. A discharge pipe then extends laterally of the pitless adaptor and then upwardly into a pump control house which contains a relief valve and pressure switch to electrically control the pump. A water reservoir or pressure tank is connected to this discharge pipe so that a quantity of water is readily available for use. The pressure switch which provides the appropriate controls for the submersible pump is connected thereto by means of electrical conduit which exits the pump house, passes through a well cap and extends downwardly into the well casing to the submerged pump.

A problem is encountered by this control system where the pump control house is used. Specifically, the pressure switch directly monitors the pressure in the water discharge pipe and is thus in fluid contact with water as the water passes along the pipe in the pump control house. Since the pump house may be located in remote regions above ground, sub-freezing temperatures may be encountered. This can cause the pressure switch to freeze either in the open or closed position. If the switch freezes in the closed position, so the pump runs, it is possible for water flooding to take place since the submersible pump remains in constant operation. Also, the submersible pump may be burnt out due to its constant running with no discharge. Should the pressure switch freeze in the open position, the pump will not run so that no water is available at the water use station. In automatic animal feeding lots, for example, this can deny the animals access to water. In remote locations, this can cause great inconvenience to the rancher since water must be hauled to the animals, without which they may die.

In addition to the inconveniences caused by subfreezing temperatures, the placement of the pump controls in the control house has other disadvantages. Since it is difficult to make a pump control house air tight, dust can infilterate the pump control house, and insects or other vermin may get into the pump control house and damage the pressure switch. Further, due to the cost of constructing a pump control house, or well pit, some wells allow the pump control apparatus, including the pressure switch, to be exposed to the elements. This can cause damage and malfunction of these units and, in addition, the units may be damaged by livestock or other animals that bump into them.

Accordingly, there is a need for a pump control apparatus which can eliminate the traditional pump control house while, at the same time, better seal the environment of the pump controls against dust, insects, vermin and the like. There is a need for such a pump control unit that resists breakdown in sub-freezing temperatures. There is need for such a pump control apparatus that is easy to use, inexpensive to construct and which allows easy access to the submersible pump located within a water well casing.

SUMMARY OF THE INVENTION

It is an object of the present invention to provide a novel, useful and non-obvious control apparatus for a pump which apparatus minimizes malfunction due to sub-freezing temperatures, dust and vermin.

It is another object of the present invention to provide an econimical pump control apparatus that eliminates the need for a separate pump control house while, at the same, offers superior performance in controlling the operation of a submersible pump.

Yet another object of the present invention is to provide a pump control apparatus that includes connections to the water pipe that is attached to a submersible pump so that the submersible pump may be easily withdrawn from the well casing.

It is a further object of the present invention to provide a control apparatus, such as used for a pump system, wherein the control and an electrical apparatus monitored and controlled by the control are located in different environmental zones.

To accomplish these objects, the present invention is directed to an apparatus that monitors the water pressure in a well to control the operation of a pump associated with a well. This apparatus includes an isolation element that is separated into two chambers by means of a flexible wall portion or diaphragm. A first one of these chambers is filled with a first or freeze proof control fluid while the second chamber being filled with water in fluid communication with water in the water pipe of the well pump. A pressure switch includes a pressure sensor in fluid communication with the control fluid so that, when the pressure of the control fluid changes, the pressure switch operates electrical contacts to activate and deactivate the pump. The pressure of the control fluid in the first chamber is altered in response to changes in the pressure of the water in the second chamber since the flexible diaphragm couples the pressures in the two chambers.

In the preferred form of the present invention the isolation element is a spherical unit that is mounted to the water pipe in the well casing at a location below the frost line of the geographical region of the well. The first fluid is a non-toxic antifreeze, and a fluid conduit extends upwardly from the isolation element to a pressure switch that is mounted at the head of the well casing. The control unit is contained in an enclosed metal bell housing that is mounted directly to the top of the well casing; the bell housing has a power inlet receiving electrical energy from a power source and includes outlet openings for the fluid conduit and the electrical conduit for the submersible pump. The second chamber of the spherical isolation element is in fluid communication with a pipe that is connected to a releasable connector that is attached to the water pipe that extends downwardly to the submersible pump.

These and other objects of the present invention will become more readily appreciated and understood from a consideration of the following detailed description of the preferred embodiment when taken together with the accompanying drawings, in which:

BRIEF DESCRIPTION OF THE DRAWING

FIG. 6 is a perspective view of the manifold and pull ring assembly according the the preferred embodiment of the present invention.

DETAILED DESCRIPTION OF THE PREFERRED EMBODIMENT

The present invention relates to the control system that is specifically adapted for use as a control for a submersible pump. The control system according to the present invention includes an isolation element adapted to be located below the frost line of the geographical region in which the apparatus is located. This isolation element separates water located in the water pipe from an antifreeze control fluid solution that is in fluid communication with a pressure switch apparatus located above the frost line. In this manner, the present invention is relatively freeze proof so that the pump controls have low maintenance and are highly reliable to temperatures as low as −80° F. The construction according to the preferred embodiment also allows for a direct connection of the assembly to the water pipe that is secured to the submersible pump so that ready and easy access is available for pulling the pump out of the well casing.

Figure 1:
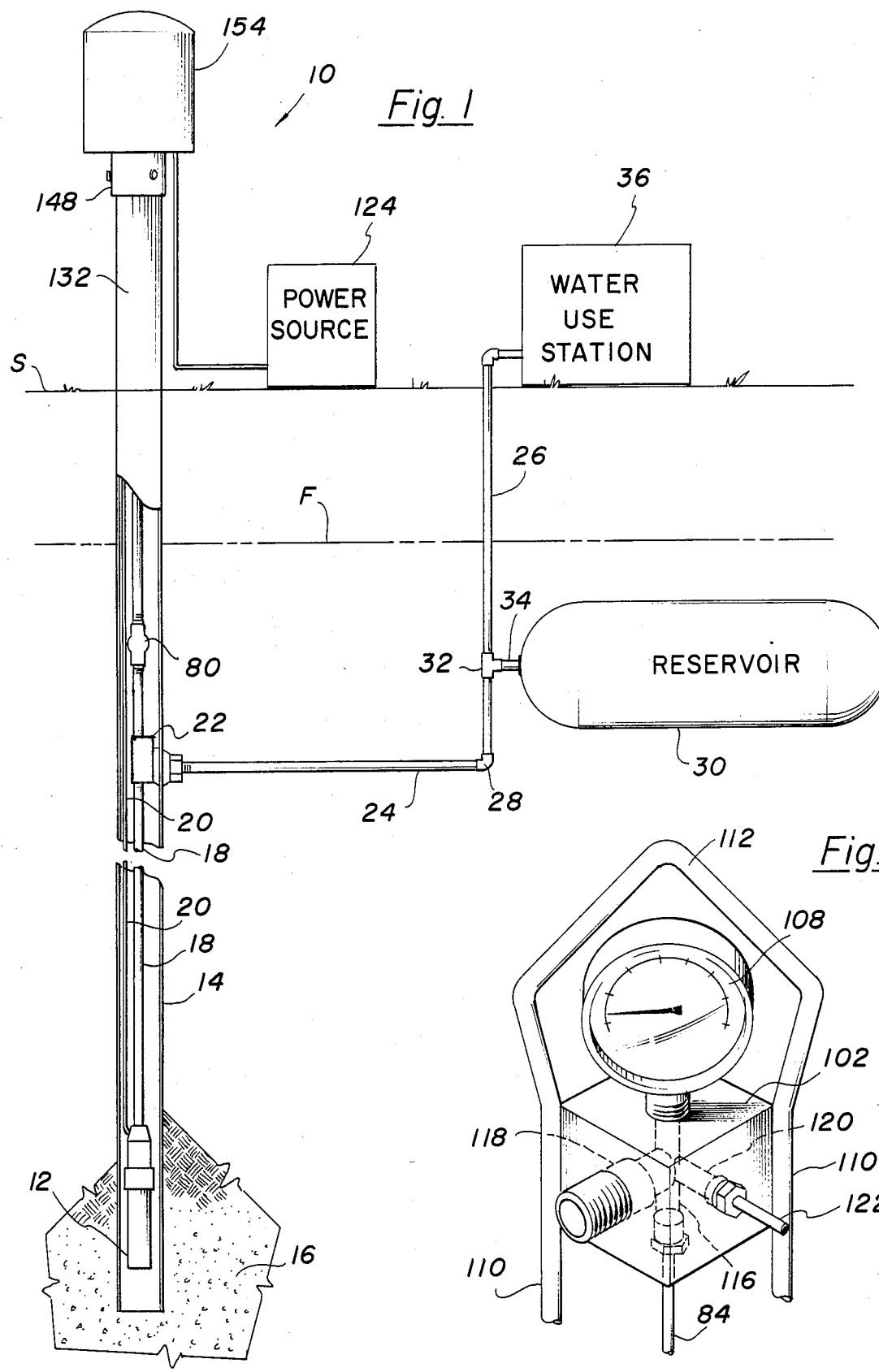
FIG. 1 is a front view in elevation, partially broken away, of a well showing the pump control according to the preferred embodiment of the present invention.

As is shown in FIG. 1, a representative pump system 10 incorporates the present invention. A submersible pump 12 is located at the lower end of well casing 14 which extends from the ground surface level S into bed 16 of the water table. Pump 12 is located so that water may enter the interior of well casing 14 through a series of ports (not shown) and be pumped upwardly from bed 16 by pump 12. To this end, a water pipe 18 extends upwardly from pump 12 to carry water, and pump 12 is supplied by electricity by means of electrical cable 20.

A releasable connector 22 interconnects water pipe 18 and a lateral water pipe 24. A vertical water pipe extension 26 is connected to water pipe 24 by elbow 28, and a use pressure tank 30 is in fluid communication with vertical water pipe 26 by means of T connector 32 and pipe 34.

In the past, releasable connector 22 has been in the form of a common pitless adaptor, and the vertical water pipe 26 extended upwardly to a pump control system that includes a relief valve and pressure switch assembly that is normally housed in a pump control house. After passing through the pump control apparatus, the water from vertical pipe 26 was passed to the water use station for consumption.

In the present invention, however, releasable connector 22 is in the form of a modified pitless adaptor, described below, and the pump house is eliminated so that water from vertical pipe 26 is passed directly to water use station 36 without being passed through the pump control apparatus. Further, the preferred embodiment of the present invention comprises a novel and nonobvious pump control apparatus that eliminates the apparatus from being in fluid contact with water in pipe 26 so that the pump control unit is not subjected to the threat of freezing or loss of integrity through vermin, insects or dust. The pump control apparatus according to the present invention, then, is shown in FIGS. 1–6 and comprises an isolation element 80 (best shown in FIGS. 3 and 5), modified releasable connector 22 (best shown in FIGS. 3 and 4), and a manifold and pressure sensing system 100 (best shown in FIGS. 2 and 6).

Figure 3:
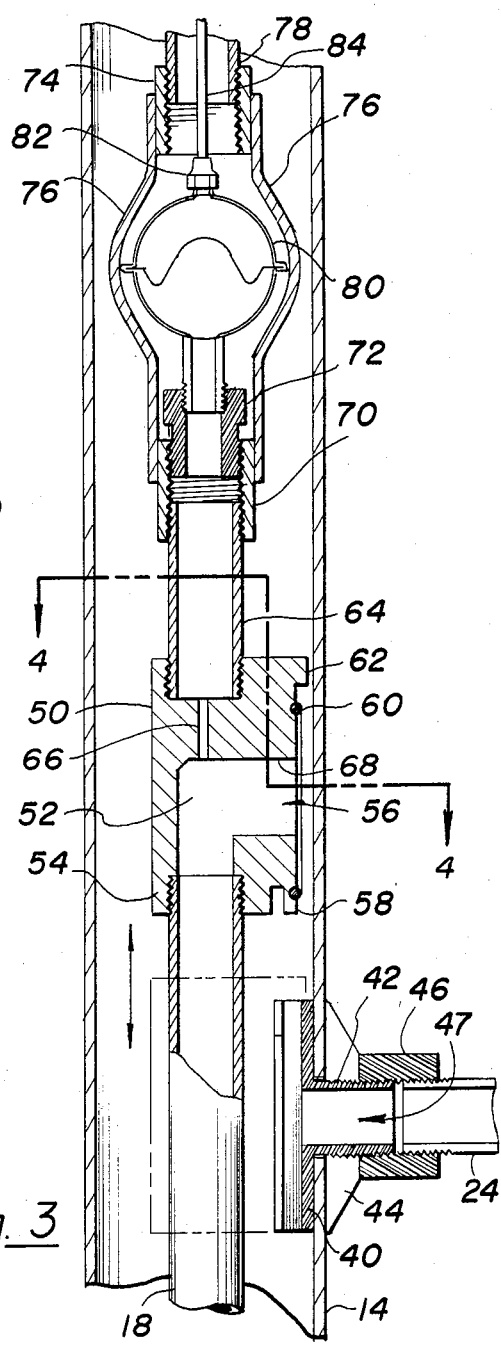
FIG. 3 is a cross-sectional view of the isolation element along with the releasable connector, shown in this released position, according to the preferred embodiment of the present invention.
Figure 4:
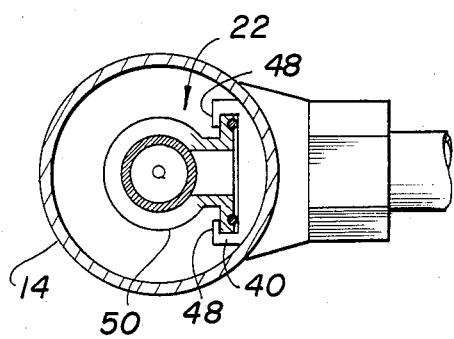
FIG. 4 is a cross-sectional view taken about lines 4—4 FIG. 3.

Referring to FIGS. 1, 3 and 4, the releasable connector 22 is in the form of a modified pitless adaptor that has a standard slide receiving element 40 which includes a threaded extension 42 that passes through a bore in the wall of well casing 14 and is secured to well casing 14 by means of a spacer 44 and a threaded nut 46. Threaded nut 46 is also threaded to receive lateral water pipe 24, and fitting 40 has a passageway 48 that is in fluid communication with pipe 24. Fitting 40 includes a pair of inwardly turned shoulders 48 that define a slide region to receive main body 50 of releasable connector 22.

Specifically, main body 50 of connector 22 has an L shaped passageway 52 that extends between a lower threaded portion 54 that receives water pipe 18 and terminates in an opening 56 formed in slide plate 58 that is received between shoulders 48 to slidably mate with element 40. A circular gasket 60 surrounds opening 56 so that gasket 60 presses against the face of element 40 when main body 50 is slidably received therein to seal L shaped passageway 52 in fluid communication with passageway 47. Passageway 52 is also in fluid communication with the interior of water pipe 18 so that water may be pumped by pump 12 upwardly through pipe 18, through passageways 52 and 47 to be then conveyed by lateral water pipe 24 toward use station 36.

An upper portion 62 of main body 50 is provided with a threadable connection that receives monitor pipe 64. In the past, an enlongated pipe has been threaded into upper portion 62 of the standard pitless adapter to allow insertion of pump 12 into its operative location in well casing 14 after which the elongated pipe is unscrewed from main body 62 so that pump 12 and water pipe 18 are suspended by the pitless adaptor that defines the releasable connector. However, in the present invention, main body 50 is modified by drilling a port 66 through end wall 68 of main body 50 so that a fluid passageway extends from passageway 52 to the interior of monitor pipe 64. Thus, water that is present in water pipe 18 may flow through port 66 and into pipe 64 as well.

A threaded upper end of monitor pipe 64 receives a union 70 at one end thereof. Union 70 is hollow and threadably receives an adaptor 72 at an end thereof opposite pipe 64. A second union 74 is rigidly mounted to union 70 on a generally common linear axix therewith by means of a plurality of rigid, arcuate arms 76. Arms 76 are secured to unions 70 and 74 by means of welding or other permanent bonding. A hollow draw pipe 78 is then threadably received by union 74 and is aligned with pipes 64 and 18.

An isolation element 80 is mounted to adaptor 72 at its lower end and is positioned between and surrounded by arcuate arms 76, as is shown in FIG. 3. An upper end of isolation element 80 threadably receives a fitting 82 that mounts a fluid conduit 84 to isolation element 80. Fluid conduit 84 extends upwardly from fitting 82 on isolation element 80, through union 74 and along the interior of draw pipe 78.

Figure 5:
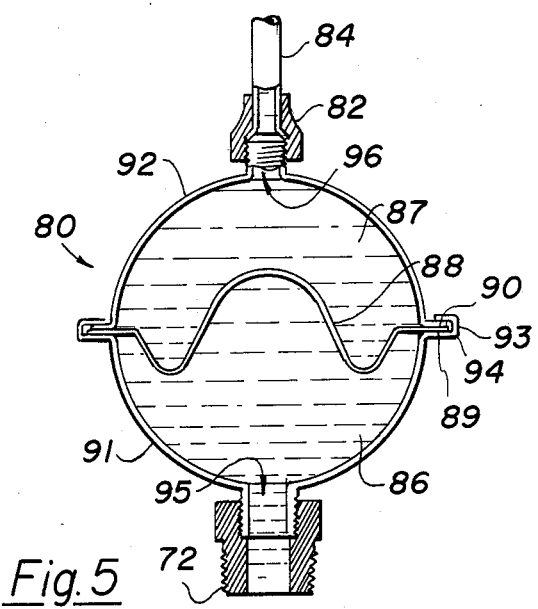
FIG. 5 is a cross-sectional view of the isolation element according to the preferred embodiment of the present invention.

The structure of isolation element 80 is best shown in FIGS. 3 and 5, and it should be appreciated that isolation element 80 is in the form of a modified water hammer arrestor.

As is shown in FIG. 5, isolation element 80 is in the form of a hollow shpere that is divided into hemispherical lower chamber 86 and hemispherical upper chamber 87 by means of a flexible wall portion or diaphragm 88. Diaphram 88 is mounted between facing edges 89 and 90 of sphere sections 91 and 92, respectively. To this end, upper sphere section 92 includes a peripheral rim 93 that is received and crimped by a reverse curved lip 94 formed on lower sphere section 91 at edge 89. It should thus be appreciated that lower sphere chamber 86 is in fluid communication with monitor pipe 64 through its port 95, adaptor 72 and union 70. Thus, in operation, lower chamber 86 fills with water that is at the same pressure as water in water pipe 18. Likewise, upper shpere chamber 87 is in fluid communication with conduit 84 by means of fitting 82 and port 96 formed at an upper portion of sphere section 92.

As described more thoroughly below, isolation element 80 functions differently than its original purpose as water hammer arrestor since chamber 87 is adapted to be filled with a control fluid having different physical characteristics than water. In prior art construction and use, a water hammer arrester is charged by pressurizing chamber 87 with air through port 96 to desired pressure. This diaphragm 88 acts as a damper for pressure fluctuations in the water source that is connected to chamber 86.

Figure 2:
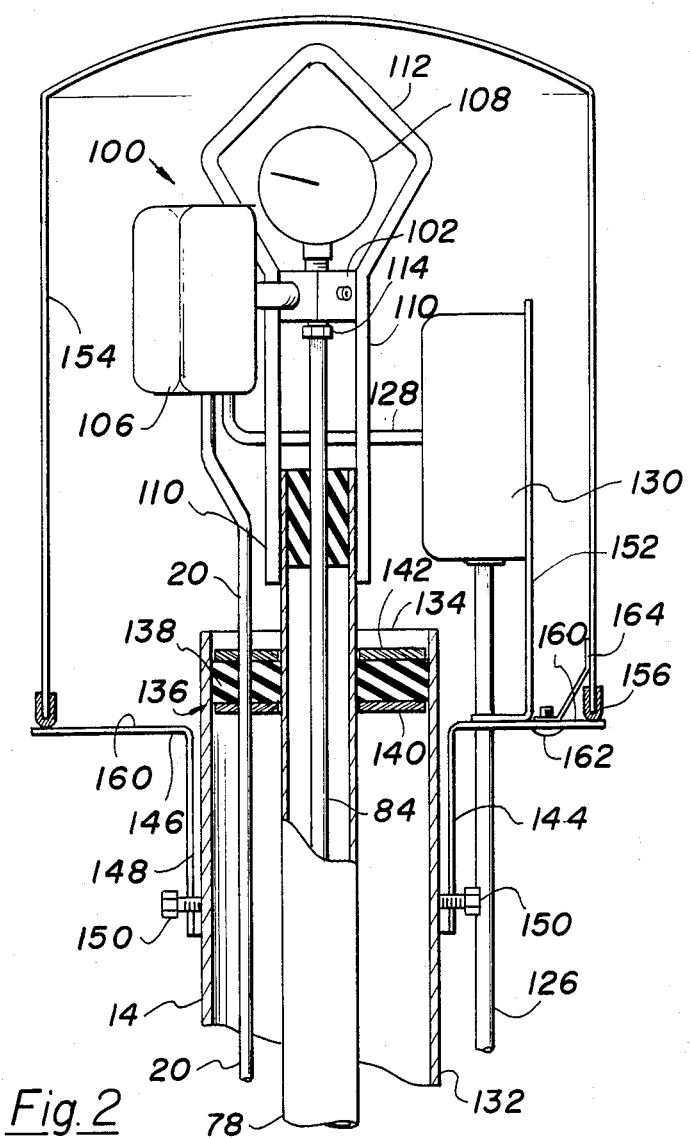
FIG. 2 is a cross-section of the pressure switch assembly and pull ring of the preferred embodiment of the present invention located within its well head bell housing structure.

In the present invention, as is shown in FIG. 2, a conduit 84 extends upwardly through draw pipe 78 to mainfold pressure sensing system 100, which comprises several elements. Manifold pressure sensing system 100 includes a manifold 102 and a pressure gauge 108. Manifold 102 is rigidly secured, such as by welding, between two legs 110 of a pull ring or pulleye 112. Thus, legs 110 are rigidly secured to draw pipe 78, and fluid conduit 84 extends upwardly between legs 110 to be connected to manifold 102 by means of a fitting 114. As is shown in FIG. 6, manifold 102 has a vertical fluid passageway 116 that is intersected by a fluid passageway 118 and a fluid passageway 120. Passageways 116, 118 and 120 are in fluid communication with one another. Thus, fluid in conduit 84 may be received by manifold 102 and may be in fluid communication with a pressure gauge 108 which is in fluid communication with passageway 116 at an opposite side thereof from the attachment of conduit 84.

A standard pressure switch 106 is secured to manifold 102, and pressure switch 106 has a standard pressure sensor in fluid communication with passageway 118. The exterior mouth of passageway 120 is sealed by nipple 122 and is provided fluid charging of the pressure sensor system after assembly. this is accomplished by injecting a desired control fluid through nipple 122. The control fluid then fills chamber 87, conduit 84 and the various passageways in manifold 102. Pressure switch 106 is then connected to power source 124 by means of electrical cables 126 and 128 through starter box 130 as is known in the art. Pressure switch 106 thus responds to fluid pressure in manifold 102 to supply power and operate pump 12 through electrical cable 20.

As is shown in FIGS. 1 and 2 well head 132 of well casing 14 extends upwardly above ground level S a distance normally required by local law with well head 132 being sealed at its proper end 134 by means of well seal 136. Well seal 136 is of standard construction having a sealing gasket 138 sandwiched between a pair of plates 140 and 142 which, when drawn together, compress gasket 138 into frictional locking engagement with the interior side wall location 14. Draw pipe 78 and electrical cable 20 pass through well seal 36 in a substantially sealed manner. Thus, the manifold pressure sensing system 100, described above, is supported on draw pipe 78.

To further house and protect pressure sensing system 100 from external elements, vermin, dust and the like, an adjustable support or collar 144 is slidably received on well casing 14 at well head 132. To this end, collar 144 includes an annular platform 146 that is connected around its interior perimeter to a sleeve 148 that telescopically receives well casing 14 and is locked in position thereto by means of a plurality of set screws 150. Starter box 130 is supportably mounted on platform 146 by means of support bracket 152, and electrical cable 126 passes through a hole in platform 146 in a substantially sealed manner. An inverted bell housing 154 then completely encloses pressure sensing apparatus 100 along with starter box 130. To this end, edge 156 of housing 154 receives a sealing molding 156 which bears against the upper surface 160 of platform 146. Housing 154 is then secured into position by means of a plurality of mounting screws 162 that extend through holes in platform 146 and are threadably received by brackets 164 that are attached to the inner sidewall of housing 154.

In construction of the above described system, draw pipe 78 is selected to be of sufficient length so that isolation element 80 is located below frost line F as is shown in FIG. 1. Thus, the pressurizing water in chamber 86 of isolation 80 is located below the frost line and is not subject to freezing. Chamber 87, conduit 84 and manifold 102 is then charged with an antifreeze solution so that the antifreeze solution extends from chamber 87, located below the frost line, upwardly to manifold 102 located above the ground surface within housing 154. In order to avoid toxicity problems, the antifreeze solution placed in chamber 87 is a non-toxic solution preferably comprising 20% grain alcohol, 30% water and 50% glycerin by volume. This mixture may be conveniently formulated by mixing 80 proof grain alcohol with glycerin in equal volumetric portions. Naturally, other non-toxic anti-freeze solutions are within the scope of this invention. A non-toxic solution is provided so that in the unlikely event that diaphragm 88 ruptures, the antifreeze solution that might mix with water will not dangereously contaminate the water should the solution be passed through pipes 24 and 26 to water use station 36.

The operation of the above described pressure sensing and control system can now be more readily appreciated. Particulary, after chamber 87, conduit 84 and manifold 102 have been charged with the antifreeze solution, this solution is maintained at the same pressure as water in chamber 86. As the water pressure in chamber 86 fluctuates, the pressure of the antifreeze solution in chamber 87 fluctuates correspondingly due to the movement of diaphragm 88. Since pressure switch 106 is in fluid communication, through manifold 102 and conduit 84, with the fluid in chamber 87, pressure switch 106 responds to the changes in water pressure in a manner identical to that as if it were in direct fluid communication with the water source. However, since all freezeable fluid in control system is located below the frost line, this system minimizes the danger of any freezing of the control system so it operates more reliably than in existing control systems.

Additional advantages of the present invention should be apparent to skilled in the art. Specifically, by rigidly interconnecting pulleye 112 to draw pipe 78 and rigidly connecting draw pipe 78 through arcuate arms 76 to monitor pipe 64, and thus to releasabe connector main body 50, a constant connection is maintained with submersible pump 12. Accordingly, should it become necessary to withdraw pump 12 from well casing 14, the well operator need only remove housing 154, release well seal 136, and attach a draw cable to pulleye 112. This eliminates the problems associated with trying to reattach a draw pipe to the pitless adapter in standard well construction procedures. Further, the cooperation of the adjustable collar 144, seal 164 and housing 154 completely encloses manifold pressure sensing system 100 and starter box 130 and protects them from potential damage. Specifically, the sensing and control system is protected from the infiltration of dust and insects, and the system is likewise protected from damage caused by vermin or other animals. By extending the vertical height of well head casing 132, the system can also be protected against the unlikely event of flooding, which is a problem currently associated with existing pump house control systems.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Apparatus adapted to monitor the water pressure in a well and to control the operation of a pump associated with the well wherein the well has a well casing extending into the ground and a water pipe for carrying water upwardly in said well casing toward a water use station, comprising:
   an isolation element having first and second chambers separated from one another by a common flexible wall portion; and
   a pressure switch having a pressure sensor in fluid communication with said first chamber and operative to operate electrical contacts in response to changes in pressure of a substantially non-compressible antifreeze liquid located in said first chamber;
   said second chamber containing water in fluid communication with water in said water pipe so that the water in said second chamber exerts force on the flexible wall portion to vary the pressure of the antifreeze liquid whereby the pressure switch electrical contacts are operated to control an electrical power source associated with said pump to control the water supplied to the water use station through said water pipe.

2. Apparatus according to claim 1 wherein said flexible wall portion is defined by a diaphragm between said first and second chambers.

3. Apparatus according to claim 2 wherein said isolation element is formed as a hollow sphere having opposite diametric openings defining fluid ports for said first and second chambers, said diaphragm extending across the interior of said sphere to separate said sphere into first and second hemispherical volumes that define said first and second chambers.

4. Apparatus according to claim 1 wherein said first fluid is a mixture including ethanol and glycerin.

5. Apparatus according to claim 4 wherein said first fluid comprises 20% grain alcohol, 50% glycerin and 30% water, by volume.

6. Apparatus according to claim 1 wherein said pressure switch is mounted to an upper end of the well casing above ground level and including a bell-housing mounted to said well casing and enclosing said pressure switch, and including a fluid conduit containing said first fluid and extending downwardly from said pressure switch through said well casing to the isolation element.

7. Apparatus according to claim 6 including a releaseable connector between said water pipe and said water use station and located at said well casing, and a draw pipe rigidly secured to said water pipe and terminating at an upward end in a rigid pull eye whereby upward force on the pull eye causes said draw pipe to disconnect the water pipe from the water use station and raise said water pipe whereby said pump and water pipe may be withdrawn from the well.

8. A control apparatus for controlling electrical power from a power source to a submersible pump located at a lower end of a well casing which extends from an underground water source to a casing head above the frost line, and wherein a water pipe is connected to the pump for conveying water from the water source to a water use station, comprising:
   a pressure switch located at an upper end portion of the casing head and having a control fluid reservoir, sensor means for sensing fluid pressure in the control fluid reservoir and electrical contacts responsive to said sensor means to control a supply of power from a power source to said pump;
   an isolation element located below the frost line and having a control fluid chamber and a water chamber separated from one another by a flexible wall portion, said isolation element including first and second fluid ports for said control fluid chamber and said water chamber, respectively;
   a fluid conduit interconnecting said control fluid reservoir and said first fluid port whereby said control fluid chamber is in fluid communication with said control fluid reservoir; and
   a substantially non-compressible antifreeze control liquid filling said fluid conduit, said control fluid reservoir and said control fluid chamber whereby the sensor means monitors the pressure thereof, said second fluid port in fluid communication with water in the pipe whereby the pressure of the control liquid correspondingly changes with variation of pressure of the water in said water pipe.

9. Apparatus according to claim 8 wherein said isolation element is formed as a hollow sphere diametrically divided by a flexible diaphragm to define said control fluid chamber and said water chamber.

10. Apparatus according to claim 9 including a releaseable connector secured to said water pipe and releaseably interconnecting said water pipe to the water use station at the well casing and a monitor pipe interconnecting said second fluid port of the isolation element and the releseable connector, said releaseable connector having a water port in fluid communication with said monitor pipe whereby water may pass through the water port, through the monitor pipe and into the water chamber.

11. Apparatus according to claim 10 including a draw pipe rigidly secured to said monitor pipe and a pull eye element at an upper end of said draw pipe whereby upward force on the pull eye element disconnects said water pipe from the water use station so that the draw pipe, the isolation element, the monitor pipe, the water pipe and the pump may be withdrawn from the well casing.

12. Apparatus according to claim 11 wherein said fluid conduit is located internally of said draw pipe.

13. Apparatus according to claim 11 including a control fluid manifold located at an upper end of the draw pipe and a pressure gauge, said manifold having a fluid inlet in fluid communication with said fluid conduit, a first fluid outlet in fluid communication with said control fluid reservoir and a second fluid outlet in fluid communication with said pressure gauge.

14. Apparatus according to claim 13 wherein said manifold has a fluid fill port in fluid communication with said fluid inlet and a valve element therein whereby control liquid may be introduced through the fill port to charge the control fluid resevoir, the manifold, the fluid conduit and the control fluid chamber with said control liquid.

15. Apparatus according to claim 13 including a well casing seal at an upper end of said well casing for substantially sealing the well casing from the external environment, said draw pipe and fluid conduit extending through the well casing seal, said pressure switch, said manifold and said pressure guage mounted to said draw pipe externally of the well casing.

16. Apparatus according to claim 15 including a collar mounted to said well casing to define an annular platform surrounding the upper portion of said well casing, and a bell housing secured to and supported by said collar whereby said platform and said bell housing substantailly enclose and protect the pressure switch, the manifold and the pressure guage.

17. Apparatus according to claim 16 including a gasket seal between the bell housing and the annular platform whereby the bell housing may be secured thereto in a substantially sealed relationship.

18. Apparatus according to claim 16 including a pump starter box supported by said collar within said bell housing and electrically interconnecting a power source and said pressure switch.

* * * * *